Figure 1:
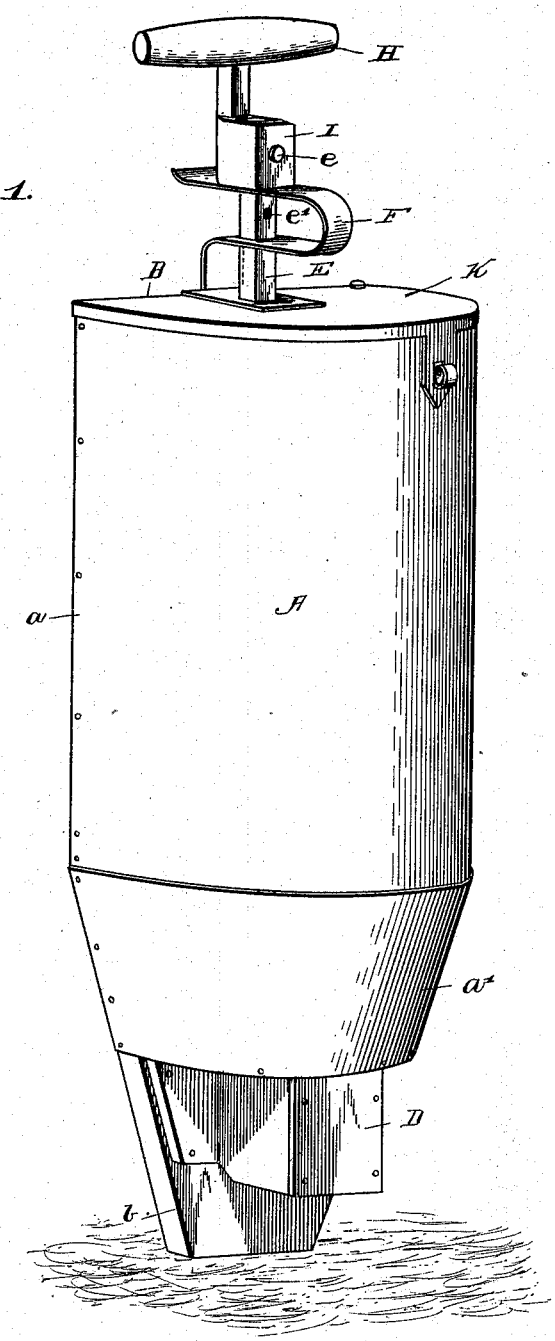

(No Model.)

2 Sheets—Sheet 1.

D. WILLIAMS.
POISON DROPPER.

No. 568,150.  Patented Sept. 22, 1896.

Witnesses

Inventor
Daniel Williams (No Model.) 2 Sheets—Sheet 2.
D. WILLIAMS.
POISON DROPPER.
No. 568,150. Patented Sept. 22, 1896.
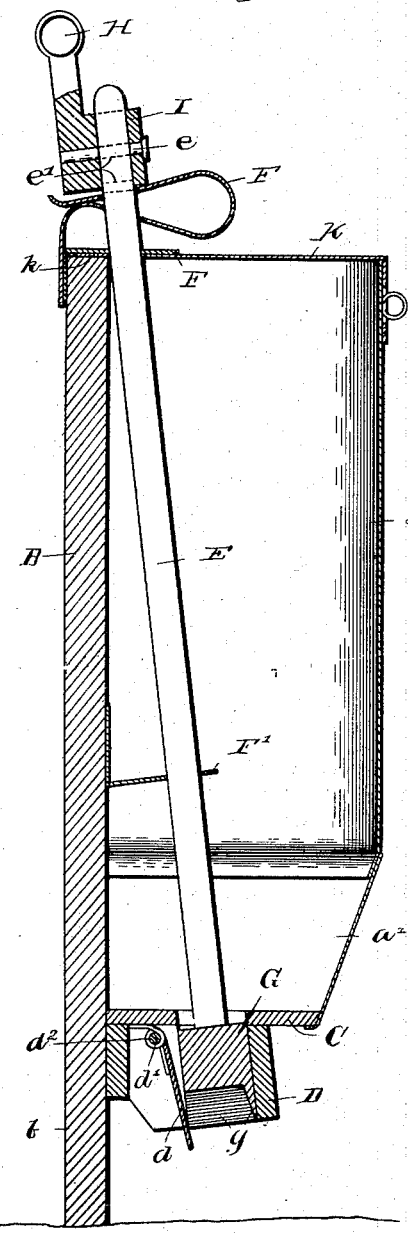
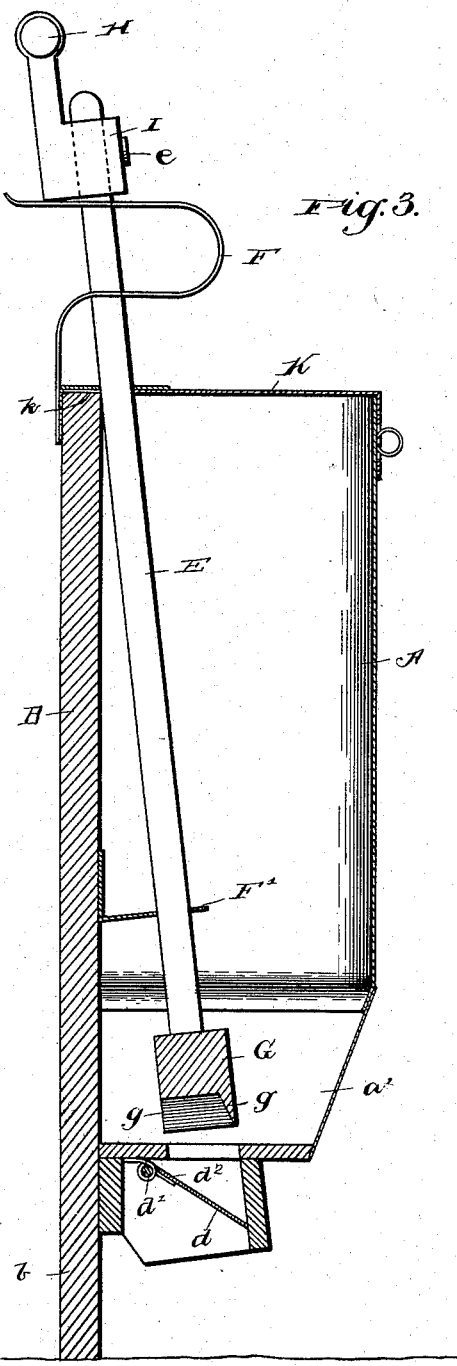
Witnesses
Inventor
Daniel Williams,
Attorney

UNITED STATES PATENT OFFICE.

DANIEL WILLIAMS, OF WILBUR, WASHINGTON.

POISON-DROPPER.

SPECIFICATION forming part of Letters Patent No. 568,150, dated September 22, 1896.

Application filed June 10, 1896. Serial No. 595,051. (No model.)

*To all whom it may concern:*

Be it known that I, DANIEL WILLIAMS, a citizen of the United States, residing at Wilbur, in the county of Lincoln and State of Washington, have invented certain new and useful Improvements in Poison-Droppers; and I do declare the following to be a full, clear, and exact description of the invention, such as will enable others skilled in the art to which it appertains to make and use the same.

My invention has relation to improvements in devices for dropping poison grain; and the object is to provide a simple, cheap, and convenient device of this class for dropping poisoned wheat, corn, and other grain in suitable localities to rid the place of squirrels, gophers, and other grain-eating animals; and to this end the novelty consists in the construction, combination, and arrangement of the same, as will be hereinafter more fully described, and particularly pointed out in the claims.

In the accompanying drawings the same letters of reference indicate the same parts of the invention.

Figure 1 is a perspective view of my improved poison-dropper, and Fig. 2 is a vertical section of the same in operative position. Fig. 3 is a similar view to Fig. 2, but showing the device out of use and in normal position.

A is a semicircular sheet-metal hopper, the edges $a\ a$ of which are secured to the flat side B, which is formed with a projecting foot $b$, which rests upon the ground when the device is being operated. The lower conical portion $a'$ of the hopper A is provided with a horizontal bottom C, in which is formed a rectangular chute D, provided with an outwardly-opening foot-valve $d$, hinged on a shaft $d'$ and provided with a coiled spring $d^2$, which normally keeps the valve closed.

E is a reciprocating plunger-rod, mounted in guides F F', secured to the side B, and its lower end terminates in a rectangular solid plunger G, formed with wings $g$ on three sides thereof, working in the chute D, and it is reciprocated by the handle H, formed with a rectangular open socket I, adjustably secured to the plunger-rod E by a bolt $e$, passing through one of the transverse holes $e'$ in the upper end of said rod. The lower end of the socket I strikes against the upper face of the spring-guide F, which limits the stroke of the plunger and at the same time takes up the jar from the handle when the device is in operation.

K is the pivoted cover of the hopper, and it is provided with a rectangular recess $k$, closing around the plunger-rod and preventing the grain spilling out when in operation.

The grain is first soaked or otherwise treated with a poisonous solution and then placed in the hopper, and the device is carried by its handle. When it is desired to drop a portion of the prepared grain, the foot of the device is rested for a moment on the ground and the handle pressed downward. The plunger then forces the grain contained in the chute down against the foot-valve, which opens outwardly and allows the charge of grain to fall on the ground. The amount of grain so deposited can be regulated by the adjustment of the socket of the handle on the plunger-rod, and which limits the play of the plunger.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

1. The semicircular hopper A provided with the flat side B, and having the rectangular chute D provided with the foot-valve $d$ and coiled spring $d^2$, in combination with the plunger G, its rod E working in guides F F', secured to the flat side B, and provided with the handle H having an open socket I adjustably secured to the rod E by a bolt $e$, substantially as and for the purpose set forth.

2. The semicircular hopper A provided with the flat side B, and having its bottom C formed with a chute D having a foot-valve $d$ and spring $d^2$, in combination with the plunger G provided with wings $g$ and rod E mounted in the spring-guide F and the stationary guide F', and the handle H having the adjustable socket I secured to said rod by the bolt $e$, substantially as and for the purpose set forth.

In testimony whereof I hereunto affix my signature in presence of two witnesses.

DANIEL WILLIAMS.

Witnesses:
 LEE G. WARREN,
 WM. JONES.